(12) United States Patent
Ji et al.

(10) Patent No.: US 10,822,489 B2
(45) Date of Patent: Nov. 3, 2020

(54) SOUND-INSULATION SHOCK-ABSORBING ABS RESIN COMPOSITION FOR AUTOMOTIVE INTERIORS AND APPLICATION THEREOF

(71) Applicant: SHANGHAI KUMHOSUNNY PLASTICS CO., LTD, Shanghai (CN)

(72) Inventors: Deyun Ji, Shanghai (CN); Ting Zhou, Shanghai (CN); Minghua Luo, Shanghai (CN); Minqi Xin, Shanghai (CN)

(73) Assignee: SHANGHAI KUMHOSUNNY PLASTICS CO., LTD., Shanghai (CN)

( * ) Notice: Subject to any disclaimer, the term of this patent is extended or adjusted under 35 U.S.C. 154(b) by 121 days.

(21) Appl. No.: 16/066,672

(22) PCT Filed: Dec. 31, 2015

(86) PCT No.: PCT/CN2015/100096
§ 371 (c)(1),
(2) Date: Jun. 28, 2018

(87) PCT Pub. No.: WO2017/113284
PCT Pub. Date: Jul. 6, 2017

(65) Prior Publication Data
US 2019/0010323 A1   Jan. 10, 2019

(30) Foreign Application Priority Data

Dec. 28, 2015 (CN) .......................... 2015 1 1004497

(51) Int. Cl.
| | | |
|---|---|---|
| C08L 55/02 | (2006.01) |
| C08L 45/00 | (2006.01) |
| B60R 21/04 | (2006.01) |
| C08J 3/12 | (2006.01) |
| C08J 3/20 | (2006.01) |
| F16F 7/00 | (2006.01) |
| G10K 11/162 | (2006.01) |
| C08L 25/16 | (2006.01) |
| B60R 13/08 | (2006.01) |
| B60R 21/02 | (2006.01) |

(52) U.S. Cl.
CPC .............. *C08L 55/02* (2013.01); *B60R 21/04* (2013.01); *C08J 3/12* (2013.01); *C08J 3/203* (2013.01); *C08L 45/00* (2013.01); *F16F 7/003* (2013.01); *G10K 11/162* (2013.01); *B60R 13/0815* (2013.01); *B60R 2021/0293* (2013.01); *C08L 25/16* (2013.01); *C08L 2201/08* (2013.01); *F16F 2224/0233* (2013.01)

(58) Field of Classification Search
CPC ... C08L 45/00; C08L 55/02; C08J 2/12; C08J 2/203; B60R 21/04; F16F 7/003; G10K 11/162

See application file for complete search history.

(56) References Cited

PUBLICATIONS

Machine translation of CN 102229736 (Year: 2011).*

* cited by examiner

*Primary Examiner* — Edward J Cain

(57) ABSTRACT

The present invention relates to a sound-insulation shock-absorbing heat-resistant ABS resin composition for automotive interiors and a preparing method thereof. The resin composition comprises: 100 parts of ABS resin, 5-30 parts of heat-resisting agent, 5-20 parts of sound-insulation shock-absorbing polymer, 1-5 parts of hollow glass microspheres, 0.3-1.0 part of light stabilizer and 0.5-2.0 parts of auxiliary. The preparing method comprises the following steps: mixing the raw materials in a high-speed mixer, sending the mixture into a twin screw extruder via a metering device, melting and compounding the material under the delivering, shearing and mixing by screws; and performing extrusion, drawing, cooling and granulating. The method is simple and feasible; and the prepared resin composition has excellent sound-insulation and shock-absorbing effects and favorable mechanical properties, and is able to be applied in the field of automotive interiors.

7 Claims, No Drawings

SOUND-INSULATION SHOCK-ABSORBING ABS RESIN COMPOSITION FOR AUTOMOTIVE INTERIORS AND APPLICATION THEREOF

CROSS REFERENCE OF RELATED APPLICATION

This is a U.S. National Stage under 35 U.S.C 371 of the International Application PCT/CN2015/100096, filed Dec. 31, 2015, which claims priority under 35 U.S.C. 119(a-d) to CN 201511004497.5, filed Dec. 28, 2015.

BACKGROUND OF THE PRESENT INVENTION

Field of Invention

The present invention relates to the technical field of high polymer materials, particularly to a sound-insulation shock-absorbing heat-resistant ABS resin composition for automotive interiors and a preparing method thereof.

Description of Related Arts

With the rapid development of the automobile industry today, automobiles are one of the most common and most important means of transport. With the increasing demands for automobiles, automobile has gradually upgraded from mere means of transportation to a comfortable space for mobility. The automobiles have brought great convenience while accompanying with inevitable noise pollution. The interior noise is mainly from various parts of the automobile outside the compartment, which is transferred into the interior of the automobile, and from the noise generated by the vibrations among the automotive interior parts, and is mainly from engine noise, body resonance noise, chassis noise, wind noise, and resonance noise in a cabinet. Too much interior noise directly deteriorates the driving environment of drivers and passengers, including physical and psychological influences, and even influences on safe driving. Therefore, the noise generated by automobiles reflects the design and manufacturing capability of automobile manufacturers to a large extent. Automobile noise is also an important measure for the mechanical properties and comfort performance of automobiles.

At present, researches on improving the interior noise of automobiles are mostly focused on the special design of structural components. The sound absorption effect is achieved by combining special material structures and certain structural combinations, such as sound-absorbing automobile door panels, roofs, fenders and the like.

Through the search of the existing patent documents, it has been found that the international application WO2004/018196 discloses a sound-insulation acrylic sheet, wherein a silk thread, a belt, a grille or a net consisting of a material incompatible with the acrylic sheet is embedded in the acrylic sheet, which is used to bind fragments when the acrylic sheet is fractured. The acrylic sheet contains a portion of opaque filler which accounts for 40% to 80% of the total weight of the sheet. A particularly preferred filler is a supplementary material formed by talcum and dolomite, which is preferably mixed with aluminum hydroxide if necessary. The acrylic sheet of the present invention is able to be used as an acoustic panel, in particular as a component for protection against noise.

The international application WO2008/050994 discloses a high-density polyester sound-absorbing synthetic material and a manufacturing device thereof. The sound-absorbing synthetic material comprises a porous sound-absorbing substrate with a density of 150 Kg/m$^3$ to 350 Kg/m$^3$ prepared by using a synthetic polyester fiber material as a substrate. A synthetic resin sheet is bonded to one side of the sound-absorbing substrate. The device comprises an insertion unit, a fixing unit and a bonding unit. The synthetic resin sheet is bonded onto the high-density porous sound-absorbing substrate prepared by using the synthetic polyester fiber material as the substrate.

The Chinese patent CN 201737057 U discloses a noise-proof car roof, which comprises a shroud plate. The noise-proof car roof is provided with a lining board, which is fixedly connected with the shroud plate. The lining board having a larger area is fixedly connected to the weak position of the shroud plate to enhance the overall rigidity of the car roof, which prevent the deformation of the roof caused by the vibrations and air damping during car running and avoid generating noise. An adhesive between the lining board and the shroud plate has large bonding surface and is simple to process. A synthetic rubber sheet has lower density and favorable shock absorbing performance, which enhance the noise-proof effect of the car roof. The synthetic rubber has no odor, and is able to be recycled.

The international application WO2005/045802 discloses an interior material, a plate product and a method for manufacturing the interior material. The interior material in the application comprises a structural member and a noise absorption layer, wherein the structural member is provided with at least one rib which is formed on the internal surface of the bottom of the structural member and contacts the internal surface of an exterior material in an inscribed manner; the rib closely contacts the exterior material to form a sealed hollow portion which is isolated from the outside; and the noise absorption layer is arranged on the external surface of the structural member. The interior material is able to effectively suppress the noise from outside the cab and improve the working environment of the working machine cab.

The international application WO2005/015539 discloses a foam sheet for an automotive interior material and the automotive interior material. The present invention provides a foam sheet which is able to maintain excellent sound absorptivity and form the automotive interior material with a required shape. The foam sheet for the automotive interior material of the present invention is characterized in that a hole portion, which is opened in the surface of the foam sheet, is formed in one surface of a modified polyphenyl ether resin foam sheet with a continuous bubble rate of 50% or above. Therefore, the vibration energies of sound may be smoothly directed into continuous bubbles of the foam sheet through the hole portion, so that a bubble wall of the continuous bubbles vibrates and converts the vibration energies of sound into heat energies, thereby performing the excellent sound absorptivity.

The pollution of the automobile noise to the environment and the damage to human health received more and more attention from all walks of life. People have invested a lot of human power, material resources and financial resources into research. The sound-absorbing and sound-insulation functions of the automotive interior materials have become a new direction for research on automotive interior materials in recent years. For example, adding felt in the connection between the automotive interior fabric and combined parts to reduce the noise generated by vibration friction.

However, the conventional technology has less research on the sound insulation and shock absorption of the materials adopted by automotive interior parts. There is a lack of research on reducing the noise in the automobile interior by improving the material itself. The application of the ABS resin in automotive interior parts is extensive, and modifying the ABS resin to achieve noise reduction by improve the material has not yet been reported.

SUMMARY OF THE PRESENT INVENTION

In order to solve the problems of the conventional technology which are insufficient researches on sound insulation and shock absorption of materials and the insufficient heat resistance of the ABS resin when being directly applied to automotive interior parts, the present invention provides a sound-insulation shock-absorbing heat-resistant ABS resin composition for automotive interiors and a preparing method thereof.

The purpose of the present invention is implemented by the following technical solutions:

In a first aspect, the present invention relates to a sound-insulation shock-absorbing ABS resin composition for automotive interiors, which comprises the following components in parts by weight:

| | |
|---|---|
| ABS resin | 100 parts, |
| heat-resisting agent | 5-30 parts, |
| sound-insulation shock-absorbing polymer | 5-20 parts, |
| hollow glass microspheres | 1-5 parts, |
| light stabilizer | 0.3-1.0 part, |
| auxiliary | 0.5-2.0 parts |

Preferably, the butadiene in the ABS resin is 10 wt. %-17 wt. %, the weight average molecular weight is 80,000-150,000, and the number average particle size of butadiene rubber is 0.3-1.0 μm.

Preferably, the heat-resisting agent is selected from a group consisting of N-phenylmaleimide-styrene-maleic anhydride copolymers (N-PMI-St-MAH) and α-methylstyrene-acrylonitrile copolymers (α-SAN).

Preferably, the sound-insulation shock-absorbing polymer is a crosslinked polymer comprising both a polystyrene hard segment and a ethylene-branched polydiene soft segment, wherein the styrene content is 12-20 wt. %, and the specific gravity is 0.89-0.94 g/cm3.

Preferably, the particle size of the hollow glass microspheres is 5-15 μm, and the true density is 0.125-0.60 g/cm3. The inventor has found that in the resin composition system of the present invention, the added hollow glass microspheres with a particle size of 5-15 μm and the sound-insulation shock-absorbing polymer are synergistically improved.

Preferably, the light stabilizer is selected from a group consisting of salicylates, benzophenone, triazines, benzotriazole UV absorbers and hindered amine free radical scavengers.

Preferably, the auxiliary is selected from a group consisting of hindered phenol antioxidants, phosphite antioxidants, ethylene bis stearamide, pentaerythritol stearate, magnesium stearate and calcium stearate.

In a second aspect, the present invention further relates to a preparing method of the sound-insulation shock-absorbing heat-resistant ABS resin composition for automotive interiors, which comprises the following steps: thoroughly mixing ABS resin, heat-resisting agent, sound-insulation shock-absorbing polymer, hollow glass microspheres, light stabilizer and auxiliary in a high-speed mixer, sending the mixture into a twin screw extruder via a metering device; melting and compounding the material under the delivering, shearing and mixing actions of screws; and performing extrusion, drawing, cooling and granulating to obtain the sound-insulation shock-absorbing ABS resin composition for automotive interiors.

Preferably, the screw length-to-diameter ratio of the twin screw extruder is 36-44; and the extrusion temperature of the twin screw extruder is 190-240° C., and the screw speed is 200-500 rpm.

Preferably, the twin screw extruder is provided with a temperature control device and a vacuum extractor.

Compared with the conventional technology, the present invention has the following beneficial:

1) the present invention adopts the technology of blending modification to melt-blend the ABS resin with the heat-resisting agent with good compatibility and the sound-insulation shock-absorbing polymer, and also adopts the hollow glass microspheres. The sound-insulation shock-absorbing polymer in the system has a synergistic action with the hollow glass microspheres on the sound-insulation and shock-absorbing effects. The sound-insulation shock-absorbing heat-resistant ABS resin composition with excellent sound-insulation and shock-absorbing properties, high heat resistance and excellent physical and mechanical properties is thus prepared;

2) the preparing method of the present invention has the advantages of simple technical process and low cost. The obtained resin has slight odor and low organic matter volatilization and is especially suitable for producing automotive interior parts.

DETAILED DESCRIPTION OF THE PREFERRED EMBODIMENT

The present invention will be described in detail below with reference to embodiments. The following embodiments will help those skilled in the art to further understand the present invention, but do not limit the present invention in any form. It should be noted that those of ordinary skill in the art can make several adjustments and improvements without departing from the concept of the present invention. These are all within the protection scope of the present invention.

According to the present invention, the butadiene content in the ABS resin is 10 wt. %-17 wt. %, the weight average molecular weight is 80.000-150,000, and the number average particle size of butadiene rubber is 0.3-1.0 μm. The sound-insulation shock-absorbing polymer is a crosslinked polymer containing both a polystyrene hard segment and an ethylene-branched polydiene soft segment, wherein the styrene content is 12-20 wt. %, and the specific gravity is 0.89-0.94 g/cm3. The particle size of the hollow glass microspheres is 5-15 μm, and the true density is 0.125-0.60 g/cm3. The light stabilizer is selected from a group consisting of salicylates, benzophenone, triazines, benzotriazole UV absorbers and hindered amine free radical scavengers. The auxiliary is selected from a group consisting of hindered phenol antioxidants, phosphite antioxidants, ethylene bis stearamide, pentaerythritol stearate, magnesium stearate and calcium stearate.

The following embodiments and comparative embodiments adopt:

ABS resin: the butadiene content is 15.6%, the weight average molecular weight is 147,000, the number average particle size of butadiene rubber is a compound of 0.3 μm and 0.8 μm, and it is produced by Kumho Petrochemical Co., Ltd in Korea;

sound-insulation shock-absorbing polymer: the designation is HYBRAR™5127, and it is produced by Kuraray Co., Ltd in Japan;

hollow glass microspheres: the designation is K15, and they are produced by the 3M Company in USA:

heat-resisting agent α-SAN (α-methylstyrene-acrylonitrile copolymers): the designation is KR2556, and it is produced by the BASF Company in Germany; and heat-resisting agent N-PMI-St-MAH (N-phenylmaleimide-styrene-maleic anhydride copolymers): the designation is MSNH and it is produced by the DENKA Company in Japan.

The light stabilizer and the auxiliary are both commercially available.

Embodiments 1-10

Embodiments 1-10 relate to a sound-insulation shock-absorbing ABS resin composition for automotive interiors and a preparation method thereof.

The preparation method comprises the following steps:

(1) preparing materials according to the components and contents thereof shown in Table 1; and (2) thoroughly mixing ABS resin, heat-resisting agent, sound-insulation shock-absorbing polymer, hollow glass microspheres, light stabilizer and other auxiliaries in a high-speed mixer, sending the mixture into a twin screw extruder via a metering device, melting and compounding the material under the delivering, shearing and mixing actions of screws, and performing extruding, drawing, cooling and granulating to obtain the low-gloss resin composition applicable to automotive interiors.

The twin screw extruder has a screw length-to-diameter ratio of 40, and is provided with a temperature control device and a vacuum extractor; and the extrusion temperature of the twin screw extruder is 200-230° C., and the screw speed is 400 rpm.

Comparative Embodiments 1-4

Comparative Embodiments 1-4 relate to a sound-insulation shock-absorbing ABS resin composition for automotive interiors and a preparation method thereof.

The preparation method comprises the following steps:

(1) preparing materials according to the components and contents thereof shown in Table 1;

(2) thoroughly mixing the above-mentioned raw materials in a high-speed mixer; sending the mixture into a twin screw extruder via a metering device; melting and compounding the material under the delivering, shearing and mixing actions of screws, and performing extruding, drawing, cooling and granulating to obtain the low-gloss resin composition applicable to automotive interiors.

The twin screw extruder has a screw length-to-diameter ratio of 40, and is provided with a temperature control device and a vacuum extractor; and the extrusion temperature of the twin screw extruder is 200-230° C., and the screw speed is 400 rpm.

TABLE 1

|  | Embodiment | | | | | | | | | | Comparative Embodiment | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 |
| ABS resin | 100 | 100 | 100 | 100 | 100 | 100 | 100 | 100 | 100 | 100 | 100 | 100 | 100 | 100 |
| α-SAN | 30 | 30 | 30 | 20 | 30 | 15 |  | 5 | 5 | 10 | 30 |  |  | 30 |
| N-PMI-St-MAH |  |  |  |  |  |  | 10 |  |  |  |  | 10 |  |  |
| Sound-insulation shock-absorbing polymer | 5 | 10 |  | 10 | 20 | 5 | 10 | 15 | 5 | 20 | 20 |  |  |  |
| Hollow glass microspheres (particle size 5-7 μm) | 1 |  | 3 |  | 5 |  |  | 3 | 1 |  |  |  |  | 5 |
| Hollow glass microspheres (particle size 9-11 μm) |  |  |  | 3 |  |  |  |  |  | 3 |  |  |  |  |
| Hollow glass microspheres (particle size 13-15 μm) |  |  |  |  |  |  | 1 |  |  | 5 |  |  |  |  |
| Triazine UV absorber | 0.3 | 0.3 | 0.3 | 0.3 | 0.4 | 0.3 | 0.3 | 0.3 |  | 0.4 | 0.4 | 0.3 | 0.4 | 0.4 |
| Hindered amine free radical scavenger |  |  |  | 0.3 | 0.6 |  | 0.3 | 0.3 | 0.3 | 0.6 | 0.6 | 0.3 | 0.6 | 0.6 |
| Hindered phenol antioxidant | 0.2 | 0.2 | 0.2 | 0.2 | 0.2 | 0.5 | 0.3 | 0.1 | 0.2 | 0.1 | 0.2 | 0.3 | 0.2 | 0.2 |
| Phosphite antioxidant | 0.3 | 0.3 | 0.3 | 0.3 | 0.4 | 0.5 | 0.3 | 0.2 | 0.3 | 0.2 | 0.4 | 0.3 | 0.4 | 0.4 |
| Pentaerythritol stearate | 0.5 | 0.5 | 0.5 | 0.5 | 0.5 | 1.0 | 0.5 | 0.5 | 0.5 | 0.2 | 0.5 | 0.5 | 0.5 | 0.5 |

Mechanical Property Tests

The sound-insulation shock-absorbing heat-resistant ABS resins for automotive interiors obtained in Embodiments 1-10 and Comparative Embodiments 1-4 are tested for mechanical properties and damping and shock-absorbing properties. The results are shown in Table 2:

IZOD notch impact strength: tested in accordance with Standard ASTM D256 (Standard Test Methods for Determining the Izod Pendulum Impact Resistance of Plastics), spline thickness is 3.2 mm;

Heat-distortion temperature: tested in accordance with Standard ASTM D648 (Standard Test Method for Deflection Temperature of Plastics under Flexural Load in the Edgewise Position), test condition is 1.82 MPa;

Flexural modulus: tested in accordance with Standard ASTM D790 (Standard Test Methods for Flexural Properties of Unreinforced and Reinforced Plastics and Electrical Insulating Materials), testing speed is 3 mm/min;

Melt index: tested in accordance with Standard ASTM D1238 (Standard Test Method for Melt Flow Rates of Thermoplastics by Extrusion Plastometer), test condition is 220° C.*10 Kg; and Loss tangent: the damping and shock-absorbing properties are measured by a dynamic viscoelasticity tester under the condition of 110 HZ.

TABLE 2

Test results of mechanical property and damping and shock-absorbing property

| | | IZOD Impact Strength (J/m) | Flexural Modulus (MPa) | Heat-distortion temperature (° C.) | Melt Index (g/10 min) | Loss Tangent (0° C.) | Loss Tangent (25° C.) | Loss Tangent (40° C.) |
|---|---|---|---|---|---|---|---|---|
| Embodiment | 1 | 276 | 2280 | 104 | 21 | 0.061 | 0.103 | 0.136 |
| | 2 | 280 | 2190 | 106 | 22 | 0.046 | 0.048 | 0.050 |
| | 3 | 291 | 2265 | 105 | 19 | 0.039 | 0.040 | 0.043 |
| | 4 | 296 | 2150 | 100 | 18 | 0.069 | 0.124 | 0.160 |
| | 5 | 265 | 2060 | 102 | 16 | 0.076 | 0.135 | 0.177 |
| | 6 | 288 | 2300 | 105 | 20 | 0.064 | 0.114 | 0.148 |
| | 7 | 302 | 2265 | 104 | 21 | 0.071 | 0.127 | 0.166 |
| | 8 | 295 | 2140 | 98 | 20 | 0.074 | 0.130 | 0.171 |
| | 9 | 300 | 2160 | 99 | 21 | 0.065 | 0.121 | 0.155 |
| | 10 | 283 | 2090 | 96 | 18 | 0.079 | 0.142 | 0.185 |
| Comparative Embodiment | 1 | 298 | 1950 | 106 | 22 | 0.055 | 0.057 | 0.061 |
| | 2 | 306 | 2300 | 104 | 23 | 0.035 | 0.036 | 0.038 |
| | 3 | 318 | 2065 | 98 | 25 | 0.036 | 0.038 | 0.040 |
| | 4 | 286 | 2370 | 107 | 16 | 0.043 | 0.045 | 0.049 |

According to the results of the mechanical properties and damping and shock-absorbing properties of the various embodiments and comparative embodiments in Table 2, the ABS resin is able to be blended with the heat-resisting agent, the sound-insulation shock-absorbing resin and the hollow glass microspheres to prepare a material with excellent damping and shock-absorbing effects and favorable mechanical properties. The introduction of the heat-resisting agent is able to obviously enhance the heat resistance of the ABS resin, which is reflected by the heat-distortion temperature, temperatures of the comparative embodiments and the embodiments. The results of the loss tangent of each embodiment proves that the sound-insulation shock-absorbing polymer and the hollow glass microspheres is able to obviously improve the damping and shock-absorbing properties of the ABS resin, and this is mainly based on the fact that the molecular chain structure of the sound-insulation shock-absorbing polymer has both a polystyrene hard segment and an ethylene-branched polydiene soft segment, a crosslinked network is formed among the molecular chains, and those special structures have great damping properties: and the hollow glass microspheres utilize the hollow structure and have an absorbing and buffering action on noises. From the test results of the mechanical properties and damping and shock-absorbing properties of Comparative Embodiments 1 and 4 and Embodiments 2-5, when the hollow glass microspheres or the sound-insulation shock-absorbing polymer is added alone, the damping and shock-absorbing properties are only significant when the addition amount is large. However, when the addition amount of the hollow glass microspheres is large, the melt index of the system decreases greatly, which will seriously affect the processing fluidity of the material. When the addition amount of the sound-insulation shock-absorbing polymer is large, the flexural modulus of the material decreases significantly, which means that the rigidity of the material deteriorates. It is worth noting that the joint use of the two will have a synergistic action, namely, achieving the effect of "1+1>2". This is due to the fact that the hollow glass microspheres are not only dispersed in the ABS resin phase, but also some hollow glass microspheres with the particle size of 5-15 μm are uniformly distributed in the crosslinked network of the sound-insulation shock-absorbing polymer, thereby having a good damping and shock-absorbing synergistic action. According to different occasions, each embodiment is able to exert its effects of sound insulation and shock absorption and at the same time, has favorable mechanical properties. The comprehensive properties of Embodiment 7 and Embodiment 8 are most suitable to be applied to automotive interior parts with different heat resistance requirements.

The specific embodiments of the present invention have been described above. It should be understood that the present invention is not limited to the above specific embodiments, and those skilled in the art can make various variations or modifications within the scope of the claims, which do not affect the substance of the present invention.

What is claimed is:

1. A sound-insulation shock-absorbing ABS resin composition for automotive interiors, comprising following components in parts by weight:

| | |
|---|---|
| ABS resin | 100 parts, |
| heat-resisting agent | 5-30 parts, |
| sound-insulation shock-absorbing polymer | 5-20 parts, |
| hollow glass microspheres | 1-5 parts, |
| light stabilizer | 0.3-1.0 part, |
| auxiliary | 0.5-2.0 parts; | wherein the heat-resisting agent is selected from an N-phenylmaleimide-styrene-maleic anhydride copolymers or an α-methylstyrene-acrylonitrile copolymers; wherein the sound-insulation shock-absorbing polymer is a crosslinked polymer comprising a polystyrene hard segment and a ethylene-branched polydiene soft segment; the styrene in the sound-insulation shock-absorbing polymer is 12-20 wt. %; a specific gravity is 0.89-0.94 g/cm3;

wherein the particle size of the hollow glass microspheres is 5-15 μm; the density is 0.125-0.60 g/cm.

2. The sound-insulation shock-absorbing ABS resin composition for automotive interiors, as recited in claim 1, wherein butadiene in the ABS resin is 10 wt. %-17 wt. %; the weight average molecular weight is 80,000-150,000; and the number average particle size of butadiene rubber is 0.3-1.0 μm.

3. The sound-insulation shock-absorbing ABS resin composition for automotive interiors, as recited in claim 1, wherein the light stabilizer is selected from a group consisting of salicylates, benzophenone, triazines, benzotriazole UV absorbers and hindered amine free radical scavengers.

4. The sound-insulation shock-absorbing ABS resin composition for automotive interiors, as recited in claim 1, wherein an auxiliary is selected from a group consisting of hindered phenol antioxidants, phosphite antioxidants, ethylene bis stearamide, pentaerythritol stearate, magnesium stearate and calcium stearate.

5. A preparing method of the sound-insulation shock-absorbing ABS resin composition for automotive interiors, as recited in claim 1, comprising steps of, mixing ABS resin, heat-resisting agent, sound-insulation shock-absorbing polymer, hollow glass microspheres, light stabilizer and auxiliary in a high-speed mixer thoroughly; sending the mixtures into a twin screw extruder via a metering device; melting and compounding the material under the delivery, shearing and mixing actions of screws; performing extrusion, drawing, cooling and granulation to obtain the sound-insulation shock-absorbing ABS resin composition for automotive interiors.

6. The preparing method of the sound-insulation shock-absorbing ABS resin composition for the automotive interiors, as recited in claim 5, wherein the screw length-to-diameter ratio of the twin screw extruder is 36-44; the extrusion temperature of the twin screw extruder is 190-240° C., the screw speed is 200-500 rpm.

7. The preparing method of the sound-insulation shock-absorbing ABS resin composition for the automotive interiors, as recited in claim 5, wherein the twin screw extruder comprises a temperature control device and a vacuum extractor.

* * * * *